United States Patent [19]

Brown

[11] 4,312,105
[45] Jan. 26, 1982

[54] PROGRAMMABLE TURRET-TYPE MACHINE TOOL

[75] Inventor: Ivan R. Brown, Horseheads, N.Y.

[73] Assignee: Hardinge Brothers, Inc., Elmira, N.Y.

[21] Appl. No.: 141,936

[22] Filed: Apr. 21, 1980

Related U.S. Application Data

[63] Continuation of Ser. No. 919,926, Jun. 28, 1978, abandoned.

[51] Int. Cl.³ .............................................. B23Q 15/26
[52] U.S. Cl. .......................................... 29/39; 29/35.5; 29/568; 408/35
[58] Field of Search ......................... 29/39, 35.5, 568; 408/35; 74/813 C

[56] References Cited

U.S. PATENT DOCUMENTS

| | | | |
|---|---|---|---|
| 2,969,490 | 1/1961 | Anderson et al. | 408/35 |
| 3,138,974 | 6/1964 | Burg | 74/813 C |
| 3,173,204 | 3/1965 | Anthony | 29/568 |
| 3,190,151 | 6/1965 | Kozacka | 408/35 X |
| 3,296,896 | 1/1967 | Uhtenwoldt | 408/35 X |
| 3,653,282 | 4/1972 | Bouffiou | 408/35 X |
| 3,686,979 | 8/1972 | Petri, Jr. et al. | 74/813 C |
| 3,909,923 | 10/1975 | Kurimoto | 408/35 X |

FOREIGN PATENT DOCUMENTS 1552553  4/1970  Fed. Rep. of Germany .... 74/813 C

Primary Examiner—William R. Briggs
Attorney, Agent, or Firm—Shlesinger, Arkwright, Garvey & Dinsmore

[57] ABSTRACT

A multiple work station machine tool turret has a highly responsive sensing control assembly which is free of environmental constraints and provides a distinct signal for each work station position correlatable with work station command data from a programmer.

8 Claims, 8 Drawing Figures

PROGRAMMABLE TURRET-TYPE MACHINE TOOL

This is a continuation of application Ser. No. 919,926, filed June 28, 1978, now abandoned.

BACKGROUND OF INVENTION

This invention relates to multiple work station machine tool turrets, and particularly to an improved sensing and control assembly for changing the work stations of such turrets.

Machine tools have been developed so that they have the capability of being programmed to perform a series of operations automatically. Such operations include forward and cross feed control as well as changing of work turret stations.

There have been limitations in the assemblies used for changing work stations, particularly with respect to their capacity to change stations rapidly, accuracy of tool alignment, and trouble-free service life.

SUMMARY AND FEATURES OF INVENTION

Accordingly, it is a principal feature of this invention to provide an improved machine tool turret assembly which is responsive to programmable information.

It is a further feature of this invention to provide a control assembly for a turret which is quick acting and provides for accurate positioning of a given work tool station.

It is a further feature of this invention to provide a control assembly for a machine tool turret which is readily correlatable with a machine tool program for sequential operation of the machine.

It is a still further feature of this invention to provide a control assembly for a machine tool turret having multiple stations which is directly correlated with the position of the turret station.

It is a further feature of this invention to provide a machine turret control assembly which is immune to fouling from dust or lubricants or vapors.

A further object of this invention to provide a machine tool control sensing assembly unit which is readily replaceable.

A still further feature of the invention is the provision of a rotating element for the turret position sensing mechanism which is directly connected to the gear train for turret rotation.

DESCRIPTION OF THE INVENTION

Figure 1:
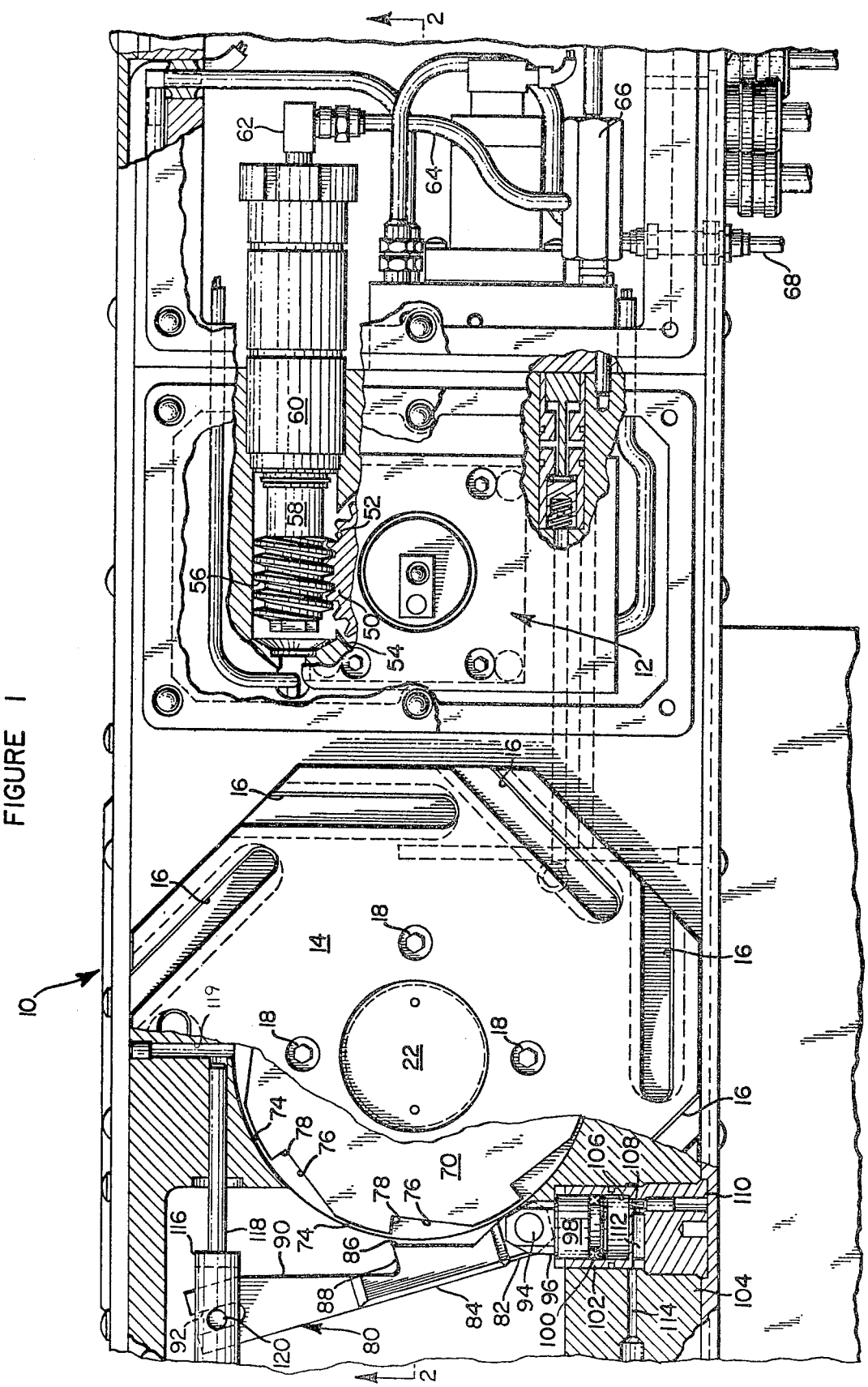
FIG. 1 is a top view of the machine tool partially cut away to show several of the working elements.

Referring particularly to the drawings, FIG. 1 shows the turret and index control assembly generally indicated at 10, and the encoder and control assembly is shown at 12. Both of these assemblies are mounted on the tool carriage, a major portion of which is shown in FIG. 1.

The encoder assembly 12 senses the station position of the turret assembly 10 and develops output signals dependent upon which station is in the work position. The encoder assembly controls operation of the turret station position change and is directly connected to the turret movement assembly. This can best be understood by describing the turret movement assembly.

Figure 2:
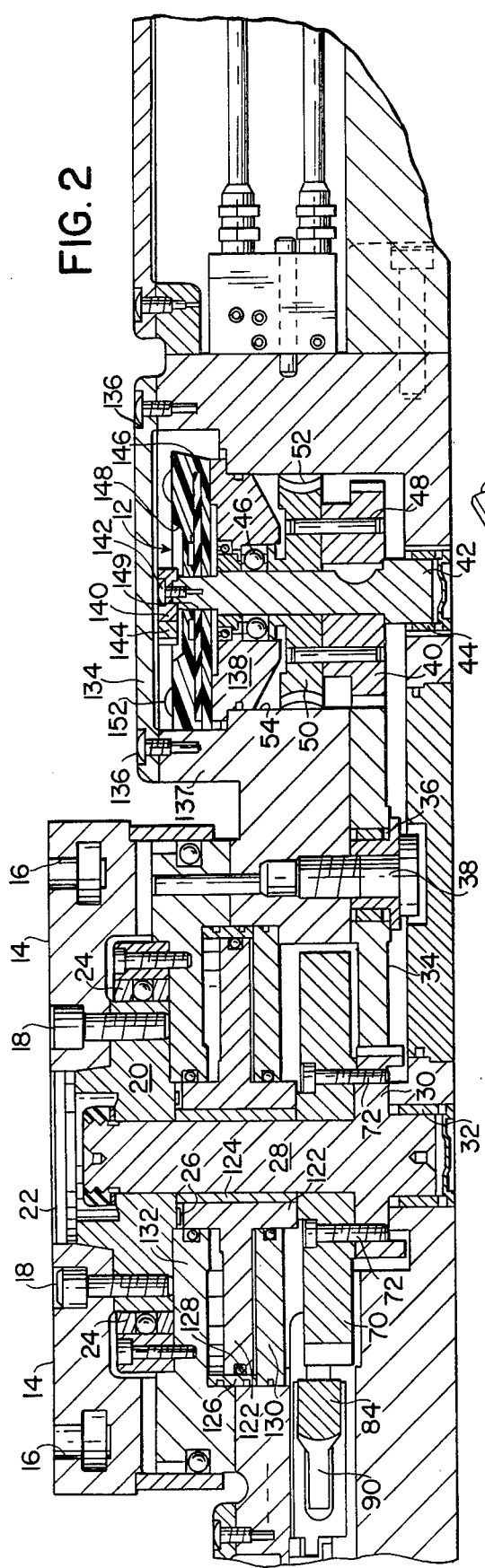
FIG. 2 is a sectional view of FIG. 1.
Figure 5:
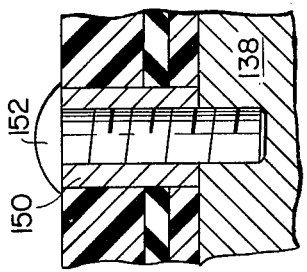
FIG. 5 is an enlarged sectional view of the bushing and screw mounting for the encoder assembly.

The turret 14 is rotatable and has tool receiving slots 16. Bolts 18 hold the turret 14 integral with a turret spindle engaging member 20, as can be seen with reference to FIG. 2. Circular cover plate 22 is mounted in the central circular opening of the upper surface of the turret 14 and covers the top of the turret spindle 28. Turret spindle engaging member 20 is supported by bearings 24 and 26 as shown in FIG. 2 and is fixed to the top section of turret spindle 28, with which it rotates. The lower section of the turret spindle 28 carries a small integrally mounted spur gear 30. The lowermost end section of the turret spindle 28 is supported by bearing 32.

As can be seen in FIG. 2, the spur gear 30 meshes with a large idler gear 34 which in turn is mounted on a bearing 36 disposed at the lower end of gear supporting spindle shaft 38. Following along the gear train, it will be seen that the large idler gear 34 meshes with drive gear 40. The drive gear 40 is supported on the lower end of the encoder shaft 42. The encoder shaft 42 is supported at its lower end by the bearing 44. The upper midsection of the encoder shaft is supported by the bearing 46.

Several pins 48 extend through the drive gear 40 as well as a worm gear 50 which has curved gear teeth and is set within the circular well 54 of the encoder housing. As can be seen in FIG. 1, the teeth 52 of worm gear 50 mesh with the worm 56 mounted on the end of shaft 58 of the air motor 60. Air is supplied to the motor 60 through the airline fittings 62. The air supply lines 64 supply air to the fitting from the common fitting 66. Fitting 66 is connected by line 68 to the external air supply.

The encoder assembly 12 senses the position of the turret and through circuitry and controls (not shown) activates the stopping mechanism for rotation of the turret through an index plate and pawl assembly shown in FIG. 1. The index plate 70 which is mounted on the turret spindle shaft 28 immediately above the spur gear 30 and is connected to it by bolts 72 (FIG. 2) acts to stop the turret. It has a circular periphery 74 and eight plural cut-out sections 76, one for each of the eight work stations. The faces 78 are accurately aligned with the position of the ends of the tool receiving slots 16 on the turret, as shown in FIG. 1.

The pawl 80 has a pivoted end section 82 and a central section 84 with a protruding section 86 which engages the indent sections 76 of the index plate 70. The flat face 88 is angularly disposed to directly engage the faces 78 on the index plate. The pawl has a free end section 90 which is slotted at 92. It is supported rotatably on the pin 94 at its other end which engages the end 82 of the pawl. The pin 94 extends through the opening of the pawl end piece 82 and the openings of the bifurcated pawl engaging section 96 of an air cushion piston 98. This piston has a quad seal 100 and is disposed within the cylinder 102 of housing 104. A small internal space 106 allows the cylinder to move inwardly when the pawl is subjected to impact on engagement with the index plate. Air bleed orifice 108 is partially blocked by needle valve element 110 for regulating the air flow through the opening. Air exhaust and supply passages 112 and 114 permit flow of air to and from the cylinder 102. They extend through the housing 104.

When it is desired to stop turret rotation, the free end section 90 of the pawl is moved into a blocking or locking position by movement of the air piston shaft member 116 and the air piston extension member 118. The air shaft member 116 has a pin 120 extending up between the two arms of the bifurcated section 92 of pawl 80. The slender air piston extension 118 extends into its cylindrical passage to provide support for the end of the shaft. The perpendicular shaft provides an air bleed 119 to preclude any pressure build-up on the air piston extension 118.

Before the piston is locked into position it must be lowered onto a locking tooth assembly, now shown. However, the mechanism for raising and lowering the turret is shown and illustrated in FIG. 2. A collar 124 supports a vertically movable circular flat lifting piston 122. It has a cylindrical bearing 126 adjacent its outer peripheral seal 128. The piston 122 moves vertically between the lower plate 130 and an upper plate 132. The collar 124 is locked to the turret spindle 28 and rotates with it. The piston 122 does not rotate.

When the circular piston 122 is raised it also raises the turret clear of the turret supporting section 132. This vertical movement will free engaging slots on the underside of the turret clear of upstanding teeth which are mounted on the top surface of the turret supporting piece 132. This structure is not shown but is explained in detail in a copending application Ser. No. 912,448, filed June 5, 1978, and entitled "TURRET INDEXING ASSEMBLY FOR MACHINE TOOLS".

Referring particularly to the encoder assembly arrangement, FIG. 1 shows the encoder assembly from a top view with the plate 134 (FIG. 2) removed. It is held in position by screws 136 which fasten into the raised peripheral housing area 137. A circular shaped encoder card support element 138 is disposed within the circular housing 54 and supports the vertical spindle shaft bearing 46. The rotor 140 is mounted on the top of the spindle shaft 42 and held in position by a lock screw 142. It carries a magnetic element 144 which is preferably a permanent magnet allow material. The rotor will rotate with the shaft 42, inasmuch as it is rotated at the same angular speed as the vertical turret shaft 28. Gears 30 and 40 have identical pitches and are joined by the idler gear 34.

Figure 3:
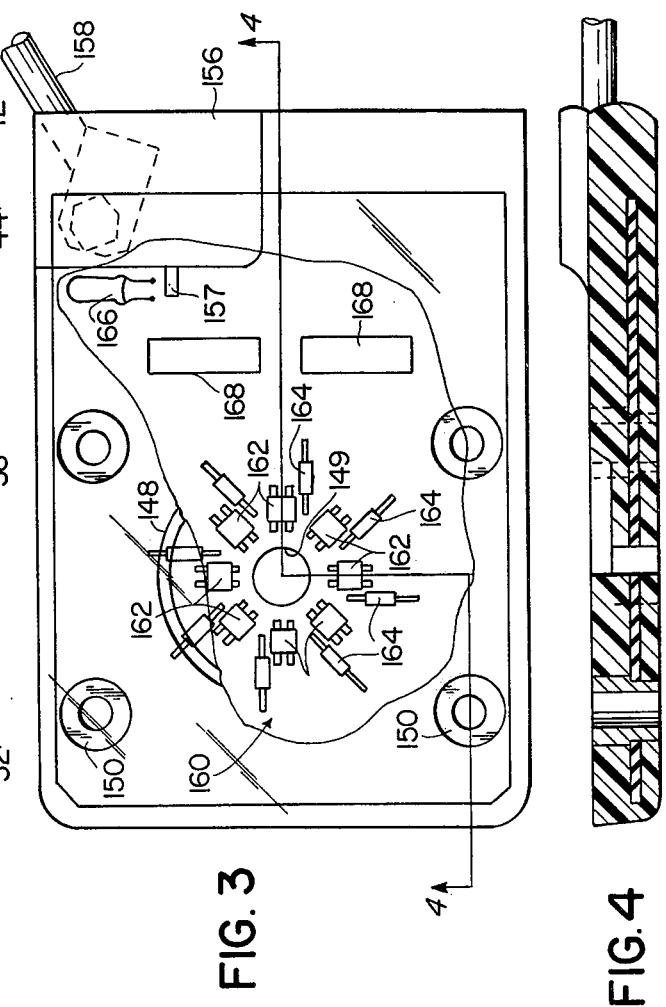
FIG. 3 is a top view of the encoder assembly partially cut away to show some of the elements mounted thereon.
Figure 4:
FIG. 4 is a side view of the encoder assembly of FIG. 3.

The encoder card assembly 146 is supported on the supporting element 138, and has a recessed central circular section 148 within which the rotor 140 travels. It has a central spindle engaging opening 149 through which the top of the spindle 42 extends. The encoder card assembly is accurately held in position beneath the rotor by accurately machined bushings 150 which are held in position by screws 152 as shown in FIGS. 2 and 3. This arrangement is critical inasmuch as the microswitches mounted on the encoder 160 card must be relatively close to the magnetic element as it passes over them.

The encoder card 160 contains the circuitry and is potted in a plastic resin to provide the finished encoder unit 146. The encoder unit has an upright lug and cable receiving section 156 to which the cable 158 controlling the circuit wires is connected. The encoder card 160 has a plurality of magnetic switches 162 of the hall effect type positioned along the arc of a circle immediately below the magnetic element 144 of rotor 140. Each of these has a resistor 164 which is connected in circuit with it. The card has capacitive elements 166 and 157 and integrated circuit elements 168 mounted on the upper face thereof as shown on the cut-away portion of FIG. 3.

Figure 6:
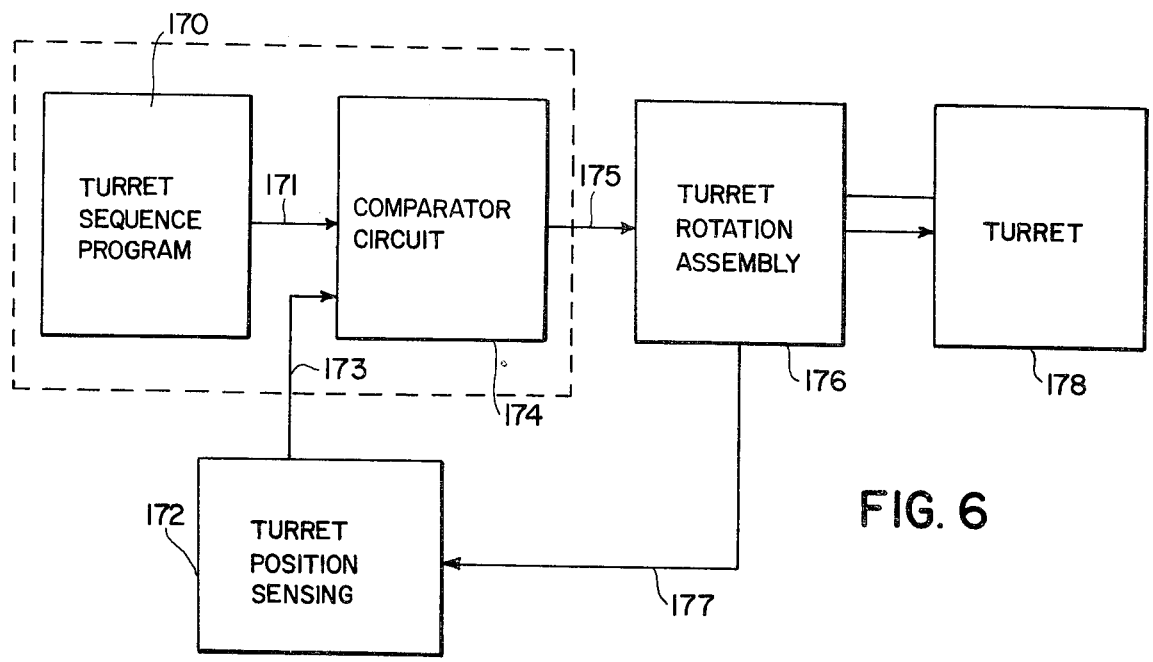
FIG. 6 is a block diagram showing the major assemblies of the invention.

FIG. 6 is a block diagram arrangement of what takes place in the control arrangement and shows the sequence of operation for the unit. Block 170 indicates the sequence turret programmer. This supplies information as to what turret work station is desired for each of the sequential operations. The turret position sensing section 172 includes the encoder sensing and control assembly. It will be noted that the output from the turret programmer and from the turret position sensing assembly are fed through lines 171 and 173, respectively, to the comparator circuit 174. When there is a match in the comparator circuit with two incoming signals along lines 171 and 173 the comparator produces an output signal along line 175 which goes to the turret rotation assembly section 176. This will include all of the mechanical and air control elements that will act to free and move the turret, such as the air motor, the gear train, the air cylinder lifting mechanism for the turret, and the stop mechanisms, including the index plate and the pawl assembly. The rotation assembly is physically connected to the turret 178 which is moved according to the signals received.

Figure 7:
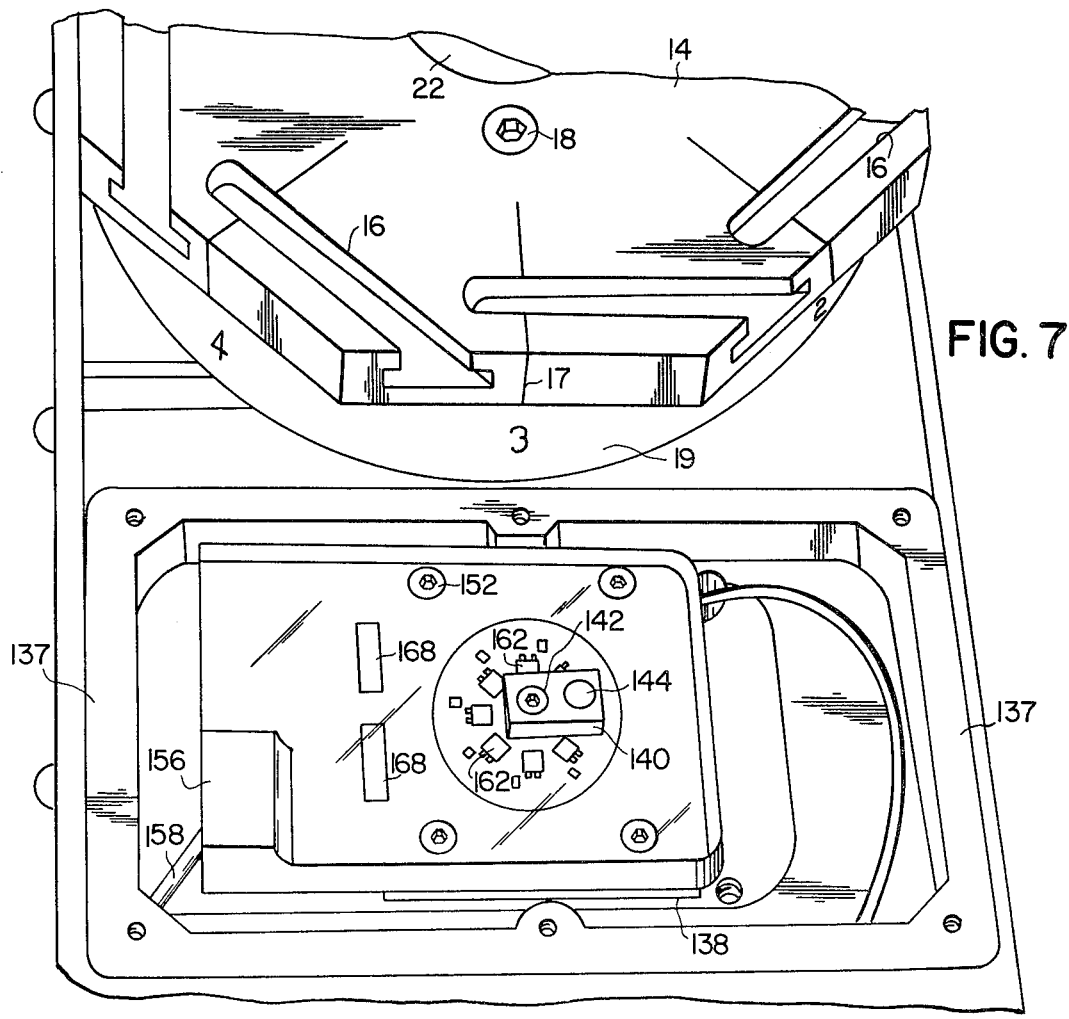
FIG. 7 is a top perspective view of the machine tool showing the turret and the encoder assembly.

FIG. 7 shows in perspective the encoder assembly and an adjacent portion of the turret. As can be seen, the turret 14 has the machine tool receiving slots 16 and markings 17 indicating the position of the tool. The stations are marked numerically as indicated at 19 from Stations numbers 1 to 8.

The rotor 140 disposed above the encoder card and near the turret is readily correlated with the markings on the turret for control purposes. The hall effect microswitch positions are given a 25° lead so that when sensing is made there is sufficient time during the course of rotation of the turret to activate the several controls to bring the moving turret to a stop accurately at the next station.

The encoder card produces a signal from the assembly which indicates the number of the work station currently approaching operative position. This is accomplished by means of a special magnetic sensing circuit shown in FIG. 8. The input lines 180 and 182 are the input lines which respectively are connected to a 12 volt potential, and to ground. Parallel lines 183 are connected to the magnetic sensing hall effect switch 184 which is connected across lines 180 and 182. This unit represents Station 1 of the turret and is so arranged on the encoder card. Capacitor 186 is a ceramic disc 680 picofarad capacitor. When the rotor 140 with its magnetic element 144 pases over the switch 184 a current or pulse is generated across it. This is transmitted to line 187. The switches are preferably Micro No. 613SS4 units, and are the same for all eight such switches.

The pulses are transmitted along line 187 to the nand gate 188 to produce an output pulse on line 190 which is the first of four output binary cable lines. The resistance in line 187, as in the other switch output lines, is a 10,000 ohm resistance element. The Station 2 hall effect switch 194 is connected across the lines 180 and 182 and has a tantalum capacitor 196 connected in parallel with it. Capacitors 186 and 196 provide the capacitance balance for the lines 180 and 182 for all of the switches. The output from switch 194 is carried along line 197 to the nand gate 198 which is activated to produce an output pulse along line 200.

In similar fashion, magnetic switch 202, representing Station 3, is connected through line 203 to both nand gates 188 and 198 to send a pulse to each of these units simultaneously. The units 198 and 188 are contained in an individual circuit element which is Teledyne 301CJ unit and is one of the two units shown at 168 in FIG. 3.

The hall effect switch 204 represents work Station 4. When it is activated it sends a pulse along line 205 to the nand gate 208, which in turn produces a pulse on line 210. Line 210 represents line number three of four output positions for the numerical code output. The single pulse on this third line represents the numeral 4 in binary code.

Work Station 5 is represented by hall effect switch 206 which is activated at the time that the turret swings into work station position number 5, and is sensed when the rotor passes over it. The output goes through line 207 which branches off and connects to both nand gates 188 and 208 to give the fifth position notation in binary code on the four coded output lines.

Similarly, switch 210 (Station 6) is connected through line 211 to both nand gates 198 and 208 to give the output code for Station 6 in binary on the four output lines. Hall effect switch element 212 (Station 7) when passed over by the rotor and magnetic element produces an output pulse along line 213 which is connected to the three nand gates 188, 198 and 208 to give the binary code output along the three lines for the number 7. Finally, as the rotor passes over switch 214, an output is produced on line 215 which travels to nand gate 218 where it is connected at 216 to give an output pulse along line 220 only, representing in binary code number 8 on the output lines.

The four output lines are connected to a decoder which will convert them from binary code form to whatever code is being used in the program. It is also possible to match up the binary code with a binary code tape that might be produced on a tape controlled unit. In any event, the arrangement of the hall effect switches, as well as the circuit in which they are associated produces an output signal which will indicate in binary form which turret station is in work position.

OPERATION

As can be seen in FIGS. 1, 2 and 3, when the turret is rotated, the gear train also rotates the encoder rotor 140 at the same angular speed as the turret. The rotor is adjusted so that is comes into accurate alignment with the desired position of the work station, and with a slight angular advance of preferably 20° to 25°, such that the signal impulse of the rotor is obtained before the work station reaches its desired position. This will permit some time for the several control elements, such as the electric circuitry, and the pawl and stop mechanism to function before the desired final position of the work station is reached.

Figure 8:
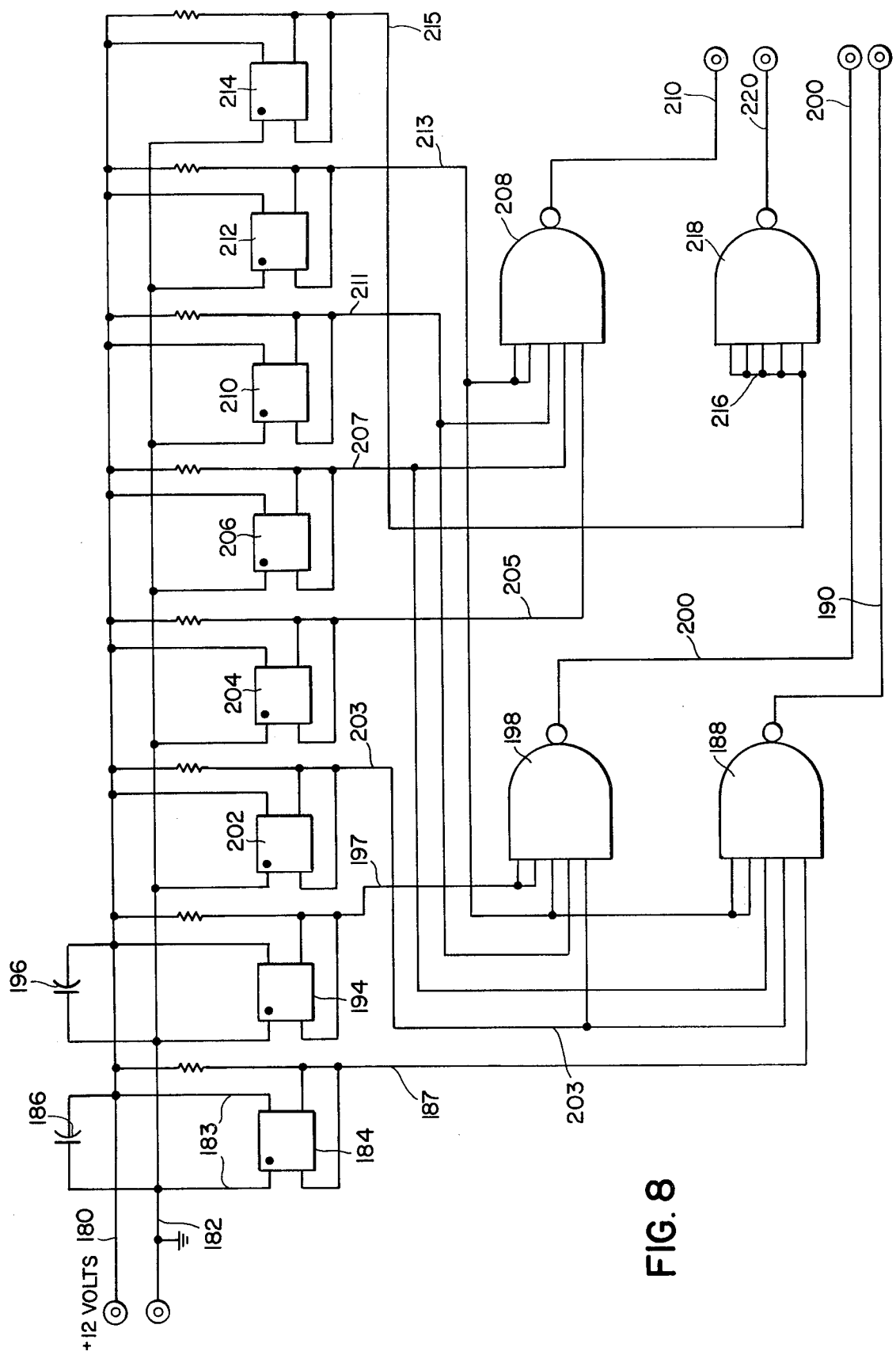
FIG. 8 is the electrical circuit of the microswitch sensing circuit of the encoder assembly.

As mentioned with respect to the description of FIG. 8, the movement of the rotor over the hall effect switches produces a binary coded output dependent upon the particular switch that is passed over by the magnet 144 of the rotor 140.

The synchronized rotation of the rotor and the turret is made possible through the gear train such that there is accurate control position. It should be noted that the encoder assembly is kept in a high and sealed position such that lubricants and other contaminants will not have any adverse effect. The circuitry is encased in a clear plastic resin such that all of the circuit elements are protected fully from contaminants. This contrasts with most sensing systems in which an exposed sensing element is needed.

For good response to the magnetic element the rotor must be kept within the range of the hall effect switches. This is on the order of approximately twenty to forty thousandths above the surface of the plastic surface of the depressed section 148. In order to do this uniformly, the bushing 150 which holds the encoder card in position is used to establish a very accurate and precise distance. The bushings are machined to within very close tolerances.

With this arrangement, the reaction and rotation time is very rapid. The turret makes a complete revolution of all eight work stations within one to two seconds. As the rotor passes over the switches successively in its line of travel, the switch circuit sends out a binary coded number corresponding to the switch immediately passed over which matches the upcoming work station on the rotating turret. When there is a match in the code number from the switch assembly with that produced from the programmer, a control signal is sent to the air motor and to the pawl assemblies. The air motor continues until the pawl control assembly is activated to bring the pawl into engagement with the index plate connected to the turret. This action takes place within a fraction of a second.

The programmer uses a perforated tape which contains the numeral code for the desired work station. In addition to this being fed through the programmer to the comparators for the work station control, the tape will also contain data on infeed and crossfeed. Accordingly, this assembly represents a substantial improvement in previous devices, and features a quick-acting rugged, construction, in which the sensing elements are completely sealed and free from possible fouling to give trouble-free service life.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A programmable turret type machine tool, comprising:
   (a) a machine tool base having a turret assembly including a machine tool turret which is rotatably mounted on the base and has a plurality of spaced machine tools,
   (b) the turret assembly including a machine tool turret rotating means which is connected to the turret for rotating it so that the spaced turret machine tools are successively rotated to a work station position, (c) a gear train having an input element rotatably connected to the machine tool turret assembly and having an output shaft the rotation of which accurately reflects the amount of machine tool turret rotation, (d) a rotor which acts as an element in a sensing circuit and is fixedly mounted on the gear train output shaft being rotatable therewith at a fixed angular correlation with respect to the rotation of the machine tool turret, (e) an encoding assembly mounted on the base and which has a plurality of arcuately spaced sensing elements disposed in a plane on a circuit line adjacent the path of rotation of the rotor so as to permit successive interaction between the rotor and the spaced sensing elements, (f) the encoding assembly producing a different coded output signal for the interaction of the rotor with different sensing elements, (g) each spaced sensing element positioned to correspond with a given work station and to provide a lead angle with respect to the actual position of the corresponding turret machine tool to give a brief time interval in which the control elements can function before arrival of the machine tool at the work station, (h) program means for controlling machine tool work station selection by providing a series of coded output signals which correlates with the codes produced by the encoding assembly, and (i) comparator means connected to the program means and to the encoding assembly for receiving the coded signals, and having an output line connected to the turret assembly for producing a turret assembly control signal when the received code from the encoding assembly unit correlates with the coded signal from the program means for a given desired work station.

2. The machine tool as set forth in claim 1, wherein:
(a) the comparator means includes a gating circuit to which coded output signals produced by the spaced sensing elements of the encoding assembly and the program means are supplied.

3. The machine tool turret as set forth in claim 1, wherein:
(a) stop means is connected to the machine tool turret rotating means for stopping the turret at a desired work station, and
(b) the output from the comparator is connected to the stop means for activating the stop means when there is a correlation of the coded output signal from the encoding assembly unit and the work station signal data received from the program means.

4. The machine tool as set forth in claim 1, wherein:
(a) the rotor includes a piece of magnetic material, and
(b) the spaced sensing elements of the encoding assembly unit include Hall effect switches.

5. The machine tool as set forth in claim 4, wherein:
(a) the spaced sensing elements of the encoding assembly unit are encased in a plastic potting material.

6. The machine tool as set forth in claims 4 or 5, wherein:
(a) the spaced sensing elements are mounted in a plane in a circular configuration, and the rotor travels in a circular path immediately above and adjacent the plane of the sensing elements.

7. The machine tool as set forth in claims 1, 3, 4, or 5, wherein:
(a) the encoding assembly unit includes a flat card on which the sensing elements are accurately mounted on the support base immediately adjacent the path of rotation of the rotor, and
(b) the encoding assembly card is readily removable.

8. The machine tool as set forth in claims 1, 3, 4, or 5, wherein:
(a) the encoding assembly unit is a thin, flat member which has the spaced sensing elements mounted thereon and encased in potting material,
(b) the sensing elements are mounted in a circular configuration adjacent an opening through the encoding assembly unit, and
(c) the rotor is mounted on a shaft which extends through the opening in the thin, flat encoding assembly member to support the rotor in close overlying relation with an arc of travel over the sensing elements.

* * * * *